Feb. 12, 1924.                                                              1,483,420
                               A. L. EWING
                    COMBINATION CAMP STOVE AND COOKER
                         Filed Aug. 14, 1922
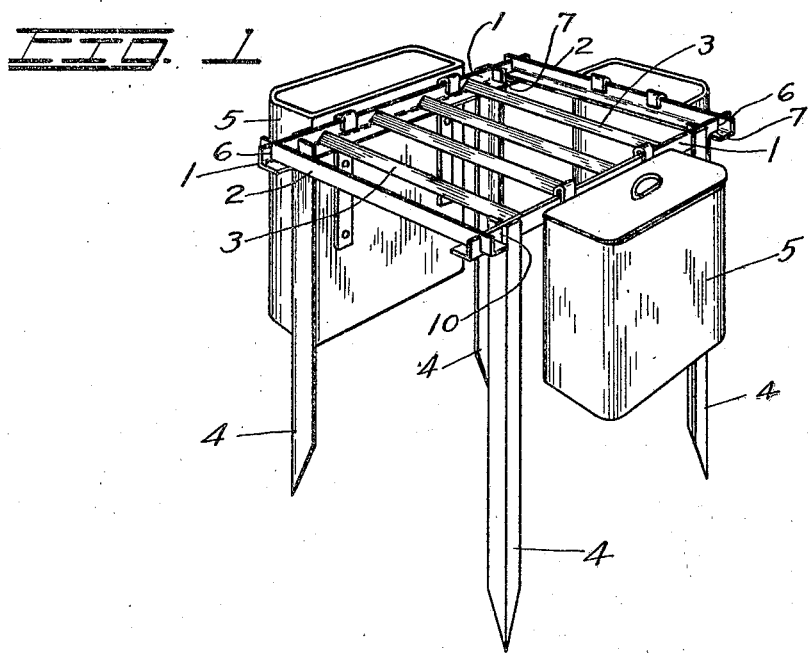
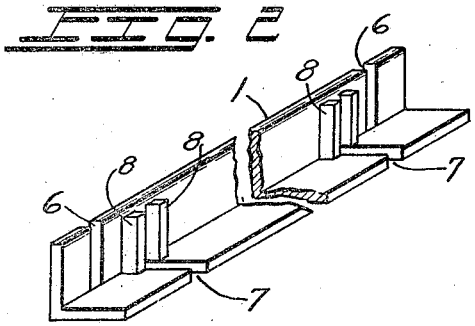   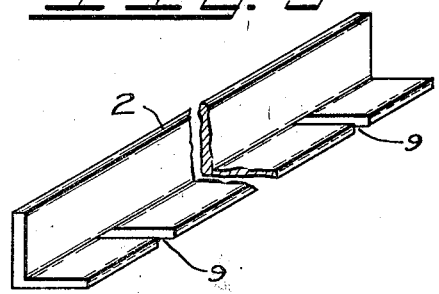
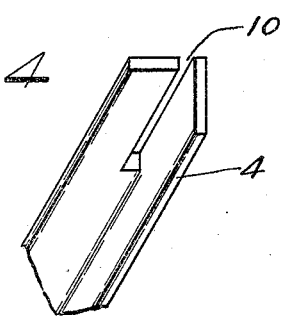
INVENTOR
*Albert L. Ewing*
BY
*Harry Bowen*
ATTORNEY Patented Feb. 12, 1924.

1,483,420

UNITED STATES PATENT OFFICE.

ALBERT L. EWING, OF SEATTLE, WASHINGTON.

COMBINATION CAMP STOVE AND COOKER.

Application filed August 14, 1922. Serial No. 581,636.

*To all whom it may concern:*

Be it known that I, ALBERT L. EWING, a citizen of the United States, residing at Seattle, county of King, and State of Washington, have invented new and useful Combination Camp Stoves and Cookers; and I do hereby declare that the following is a full, clear, and exact specification, such as will enable others skilled in the art to which it appertains to make and use the same.

The invention is a collapsible device used for holding utensils over a camp fire.

One object of the invention is to provide a device for holding utensils over a camp fire which may be readily taken apart.

Another object of the invention is to provide a device for holding utensils over a camp fire which when taken apart will occupy a very small space.

Another object of the invention is to provide a device for holding utensils over a camp fire which may be easily assembled ready for use.

And a further object of the invention is to provide a device for holding utensils over a camp fire which will have a flat grid on top and receptacles on the sides.

With these ends in view the invention embodies a frame constructed of angular shaped members having slots adjacent their ends for fitting them together and utensils with hooks on them which may be hooked over the vertical edges of the horizontal side members.

Other features and advantages of the invention will appear from the following description taken in connection with the drawings, wherein:—

Figure 1 is a view showing the device assembled.

Figure 2 is a detail view showing one of the side members.

Figure 3 is a detail view showing one of the end members.

Figure 4 is a detail view showing the top of one of the posts.

In the drawings I have shown my device as it would appear wherein numeral 1 indicates the side members, numeral 2 the end members, numeral 3 the grate bars, numeral 4 the posts, and numeral 5 the utensils.

In the side members 1 are vertical notches 6 in which the end members 2 are held and also horizontal notches 7 through which the upper ends of the posts 4 project. On the vertical leg of the member 1 may also be placed lugs 8 which hold the post in a vertical position.

In the horizontal legs of the end members 2 are slots 9 which slip over the vertical legs of the members 1 in order to hold the device laterally and in the upper ends of the posts 4 are slots 10 into which the vertical legs of the members 1 fit. The lower ends of the posts may be pointed as shown in Figure 1 so that the posts may be driven into the ground.

The utensils 5 may be constructed as shown and may have hooks riveted to them so that they may be hooked over the vertical legs of the side and end members. These utensils may be made in the shape shown and they may be made in three sizes with each one a little smaller than the one before so that the two smaller ones may be packed together and then placed into the larger one; or they may be made in any desired shape with any suitable hooks on them for hooking them over the vertical legs of the side and end members.

The grate bars 3 may be made of any desired material and in any shape desired but are preferably made of cast iron and L shaped so that they will withstand the heat and so that they may be packed in a small space.

It will be understood that other changes may be made in the construction without departing from the spirit of the invention. One of said changes may be in the shape of the posts as they may be of any suitable design. Another may be in the location of the slots as those for the posts may be placed in any suitable positions and those for the end members may also be placed wherever desired. And another change may be in the shape, size or number of the utensils 5.

The construction will be readily understood from the foregoing description. To use the device it may be assembled as shown in Figure 1 with the utensils 5 placed on the sides and the posts 4 driven into the ground. A fire may then be built under it and while some provisions are being cooked on top water may be heated or other provisions may be cooked in the utensils on the sides. It will be seen that the tops of the posts 4 fit up into the notches 7 and the notches 10 in the posts will slide upward on the vertical legs of the members 1 and then the members 2 may be placed in the notches 6 with the notches 9 sliding downward over the vertical legs. By assembling it in this manner all the joints will be free and at the same time they will be rigidly held without the use of bolts or any other means for holding them together; and as the joints are free the device may be quickly and easily taken apart when it is desired to pack it.

Having thus fully described the invention what I claim as new and desire to secure by Letters Patent is:—

A combination camp stove and cooker of the class described comprising angular shaped horizontal side members having vertical slots and horizontal slots adjacent each end; lugs on the vertical members above the horizontal slots; horizontal angular shaped end members having horizontal slots adjacent to each end; vertical angular shaped members having vertical slots in their upper ends and having their lower ends pointed; angular shaped grate bars; and utensils having hooks to fit over the vertical legs of the side and end members, said utensils being of such a size that all of them will fit into the largest one.

ALBERT L. EWING.